United States Patent [19]
Kahlen et al.

[11] Patent Number: 5,322,431
[45] Date of Patent: Jun. 21, 1994

[54] APPARATUS FOR BLOWING A FILM OF THERMOPLASTIC SYNTHETIC RESIN

[75] Inventors: Wilhelm Kahlen, Troisdorf-Eschmar; Peter Niegerl, Bad Honnef-Rottbitze, both of Fed. Rep. of Germany

[73] Assignee: Reiffenhauser GmbH & Co. Maschinenfabrik, Troisdorf, Fed. Rep. of Germany

[21] Appl. No.: 19,478

[22] Filed: Feb. 18, 1993

[30] Foreign Application Priority Data

Feb. 21, 1992 [DE] Fed. Rep. of Germany ... 9202272[U]

[51] Int. Cl.[5] .............................................. B29C 55/28
[52] U.S. Cl. .................... 425/72.1; 425/326.1; 425/387.1
[58] Field of Search ............... 425/72.1, 326.1, 387.1, 425/141; 264/209.3, 209.7, 566, 569

[56] References Cited

U.S. PATENT DOCUMENTS 4,643,657 2/1987 Achelpohl et al. ............ 264/566 X
4,955,802 9/1990 Halter et al. ..................... 425/72.1

FOREIGN PATENT DOCUMENTS

| 0130909 | 1/1985 | European Pat. Off. . |
| 2814283 | 10/1979 | Fed. Rep. of Germany . |
| 2925937 | 1/1980 | Fed. Rep. of Germany . |
| 3820530 | 5/1990 | Fed. Rep. of Germany . |
| 3903174 | 8/1990 | Fed. Rep. of Germany . |
| 56-4433 | 1/1981 | Japan ................................ 425/72.1 |

Primary Examiner—Richard L. Chiesa
Attorney, Agent, or Firm—Herbert Dubno; Yuri Kateshov

[57] ABSTRACT

A device for feeding film-blowing air into the plastic tube and film bubble of a blowing head is connected to the film-blowing head and includes between the foot side and head side outlets thereof, with at least one intake device and at least one further outlet in spaced relationship and with matched flows to stabilize the tube and the neck formed between the tube and the expanding bubble.

10 Claims, 3 Drawing Sheets

APPARATUS FOR BLOWING A FILM OF THERMOPLASTIC SYNTHETIC RESIN

FIELD OF THE INVENTION

Our present invention relates to a device adapted to be attached to a blowing head of a film-blowing machine for introducing blowing air into the thermoplastic bubble or balloon blown in the tube extruded from the blowing head.

More particularly, the invention relates to a device which extends along the tube for introducing the blowing air into the latter.

BACKGROUND OF THE INVENTION

A blowing head for producing plastic film generally has an annular orifice from which a tube of thermoplastified synthetic resin is extruded so that, at a location downstream from the orifice this tube can be expanded or blown into a bubble or balloon, thereby reducing the wall thickness and forming a tube of the thermoplastic film.

It is known to provide a tubular device which can be affixed to the blowing head and which withdraws the blowing and cooling air through the inner tube while the film-blowing air is fed to the clearance between the device and the thermoplastic tube through a jacket or outer tubular member, being supplied to the latter from a source of the film-blowing air.

In the course of film blowing (see, for example German Patent Document DE-PD 38 20 530), a neck is formed between the film balloon and the plastic tube which is comparatively long and whose stability depends upon rheological and aerodynamic conditions.

In practice, it has been found that the neck region and tube tend toward instability when, for example, the device as described in the above-mentioned patent document has outlets for the film-blowing air only at the foot side of the device proximal to its connection to the blowing head and at its head side, i.e. remote from the blowing head.

The stabilization is here effected by balancing the amount of blowing air supplied with that which is withdrawn through the inner tube but in many cases, especially where the neck is comparatively long, instabilities still arise and improvement is required.

OBJECTS OF THE INVENTION

It is, therefore, the principal object of the present invention to provide an improved device for feeding film-blowing air to the thermoplastic tube and balloon of a blowing head, whereby drawbacks of earlier systems are avoided.

Another object of the invention is to provide a device which can be mounted upon the blowing head and/or an assembly therewith which can improve the stability of the film-blowing operation and particularly the neck of a film-blowing system as described.

SUMMARY OF THE INVENTION

These objects are attained, in accordance with the invention by distributing over the length of the device formed by the inner tube and the outer Jacket or tubular member, between the outlet at the foot side and the outlet at the head side, at least one blowing air intake device at which the blowing air is withdrawn from the flow passage formed by the clearance between the jacket of the device and the thermoplastic tube, into the inner tube, and toward the head of the device, but spaced from the outlet at the head side, at least one further blowing air outlet for feeding the blowing air into the flow passage between the Jacket and the thermoplastic tube. The intake means as well as the additional blowing-air outlet are aerodynamically matched with respect to flows therethrough to stabilize the plastic tube and/or the film balloon.

The invention is based upon our discovery that stabilization can be effected by controlling the flow between the original air outlets of the prior art device by matching flow from an additional air outlet close to the outlet previously provided at the head side of the device but spaced therefrom and an intake proximal to but spaced form the outlet previously provided toward the foot side of the device. Even with comparatively long plastic tubes and long necks, this arrangement appears to prevent fluttering between the two outlets originally provided and associated with a pumping action can be avoided.

The matching can be easily accomplished with simple tests and the device can have a variable length by, for example, providing telescoping inner tube and outer tube sections.

Advantageously, the intake device is comprised of a plurality of angularly equispaced tubular fittings which pass through the jacket and the gap between the Jacket and the inner tube and communicate between the clearance around the Jacket and the inner tube. The mouths of the tubular fittings can be juxtaposed with a turbulence sieve disposed between each mouth and the clearance which can suppress skein flow.

The fittings can be received in streamlined holders located in the gap between the jacket and the inner tube.

In order to ensure that the flow in the region of the additional outlet or outlets is highly homogeneous, the additional outlet can be formed by bores distributed circumferentially in the jacket and which communicate between the annular gap and the flow clearance by opening into a distributing chamber which can have a circumferentially continuous annular slot communicating with this clearance.

The intake device and the outlet can be adjusted as noted for control or regulation of the respective flows for matching as described.

BRIEF DESCRIPTION OF THE DRAWINGS

The above and other objects, features and advantages of the present invention will become more readily apparent from the following description, reference being made to the accompanying drawing in which.

DESCRIPTION OF THE PREFERRED EMBODIMENT

Figure 1:
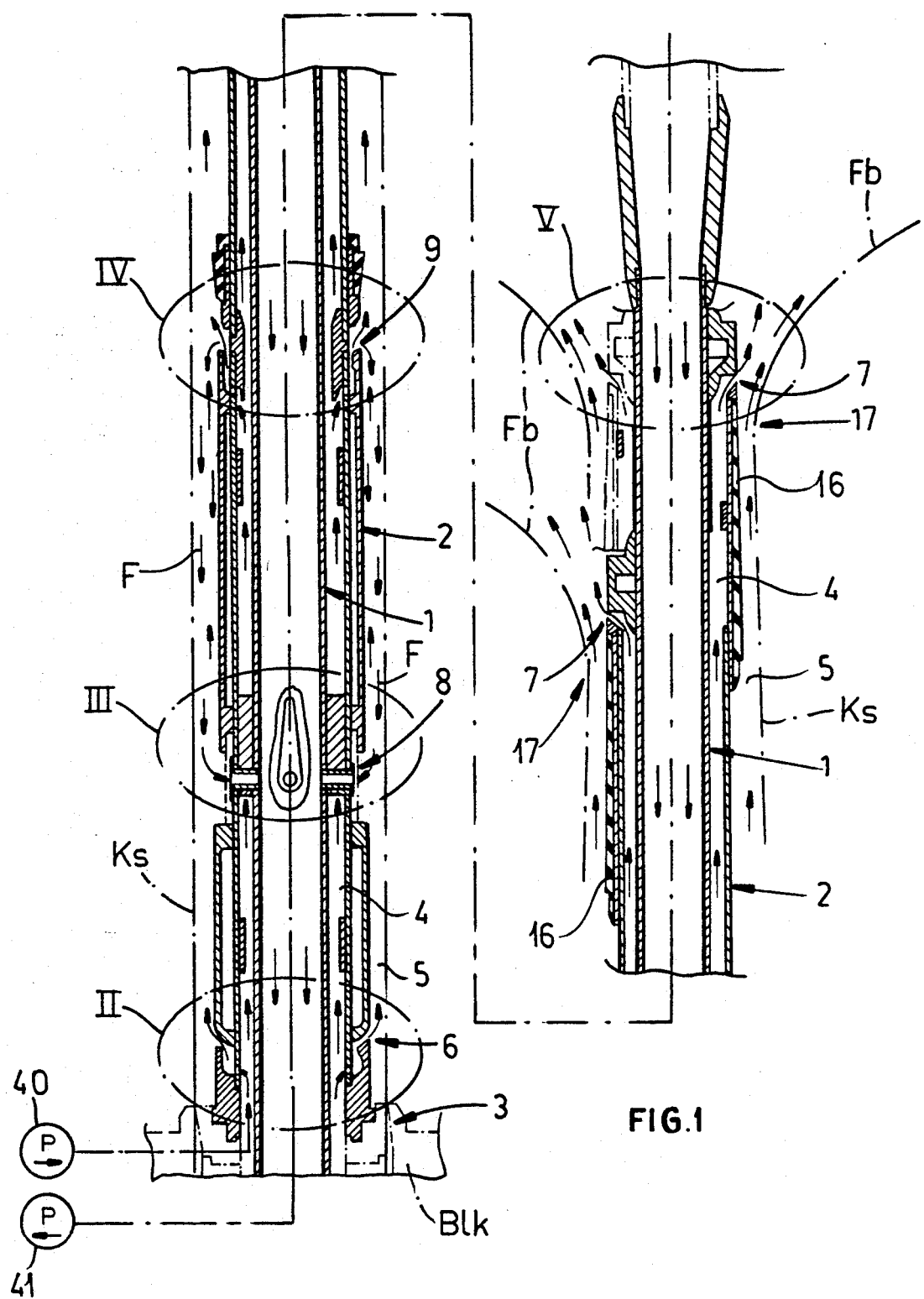
FIG. 1 is an axial section through a device according to the invention shown affixed to a blowing head.

The blowing head is represented in the drawing at Blk and extrudes a thermoplastic tube of thermoplastified synthetic resin Ks.

The device of the invention is affixed to the blowing head and the plastic tube Ks surrounds the device, defining a flow passage or clearance 5 therethrough running to the foil balloon or bubble Fb.

The device comprises an inner tube 1, a tubular outer Jacket or outer tubular member 2 and a connecting means 3 for connecting this device to the blowing head Blk.

The outer member 2 or jacket surrounds the inner tube 1 with an annular gap 4 which serves for feeding the film blowing air, e.g. from a pump 40, to the gap 4.

The interior of the tube i can be evacuated by a suction blower 41 which evacuates the cooling air from the bubble at the free end of the tube I remote from the blowing head Blk, i.e. at the head of the device.

The air flow is represented by the arrows shown in the drawing.

The outer jacket 2 at the foot of the device proximal to the blowing head Blk and at the head of the device remote from the blowing head has slit-like outlet openings 6 and 7 for feeding the blowing air into the flow passage or clearance 5 and the film balloon Fb.

As can be seen from FIG. I as well, over the length of the assembly formed by the inner tube i and the outer Jacket 2 distributed between the outlets 6 and 7, are an air intake device 8 which is close to but spaced from the outlet 6 at the foot side of the device and an additional air outlet 9 close to but spaced from the outlet 7 at the head side of the device. The intake 8 draws the blowing air from the passage 5 into the inner tube while the additional outlet 9 feeds blowing air from the gap 4 into the passage 5. The quantities of air drawn by the suction device 8 and discharged by the outlet 9 are aerodynamically matched to one another.

Figure 2:
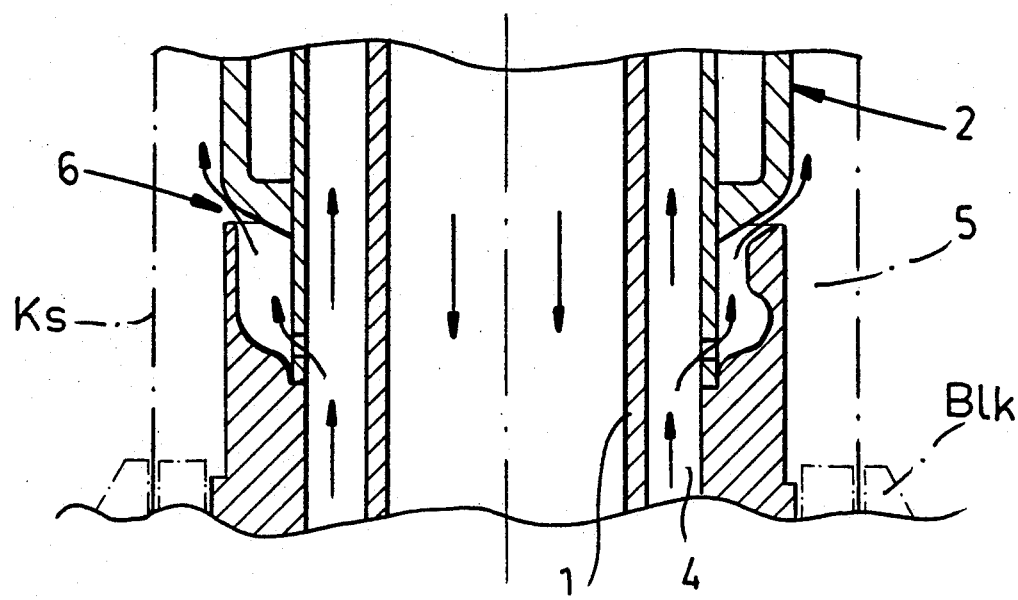
FIG. 2 is a cross sectional view representing a detail of the region II of FIG. 1.

From FIG. 2, it will be apparent that the outlet 6 for discharging blowing air into the passage 5 at the foot of the device includes a slit which directs the air outwardly and in the direction of movement of the tube Ks.

Figure 5:
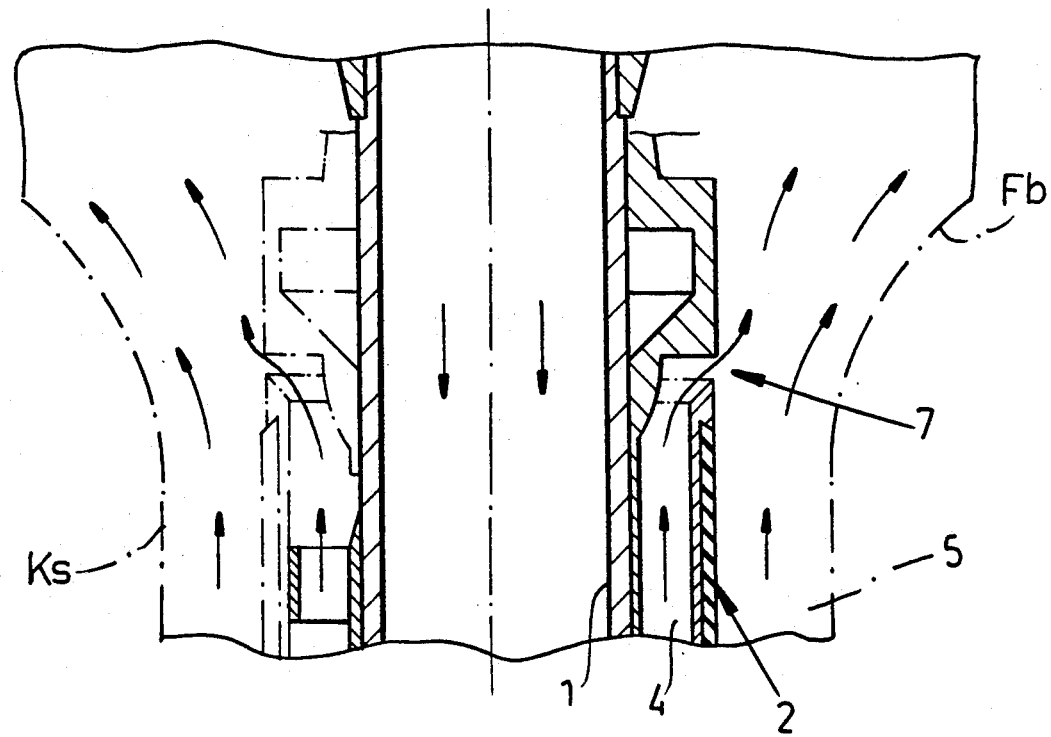
FIG. 5 is a detail of the region V thereof.

Similarly FIG. 5 illustrates a configuration of the outlet slit 7 in the region of the film balloon which functions similarly.

Figure 3:
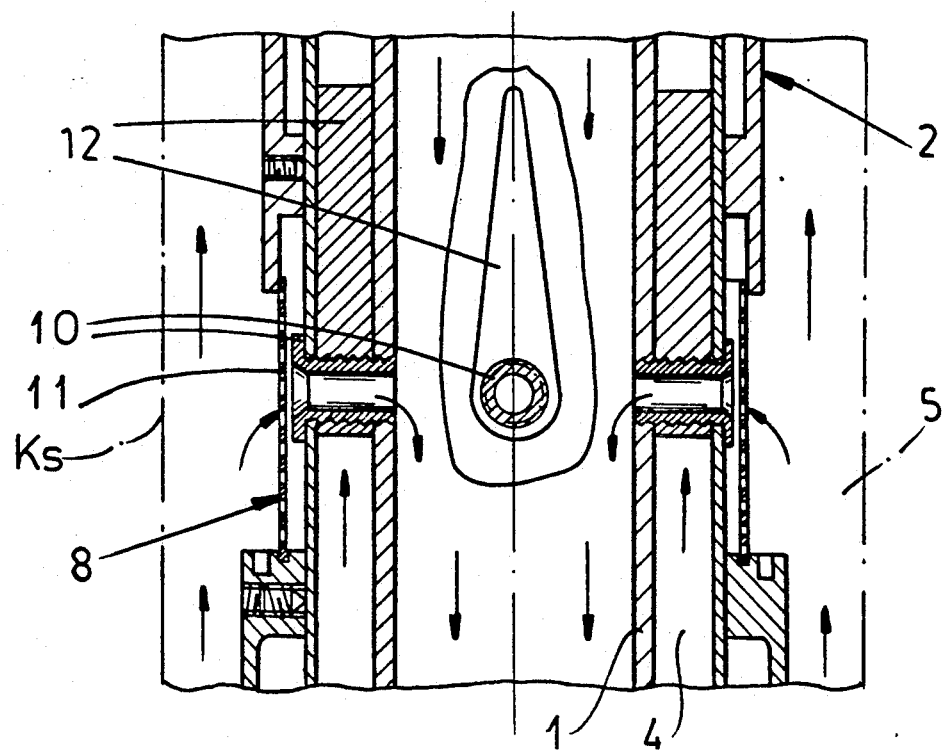
FIG. 3 is a detail of the region III of FIG. 1.

The construction of the air intake device 8 can be readily seen from FIG. 3 to comprise a plurality of angularly equispaced tubular fittings 10 opening toward the space 5, communicating with the interior of inner tube 1 and passing through the outer jacket 2 and the wall of tube 1.

Ahead of the fitting 10 along the exterior of the Jacket turbulence sieves 11 are provided. The fittings 10 are received in holders 12 which are streamlined in the gap 4 to enable the blowing air to flow past them with a minimum of turbulence.

Figure 4:
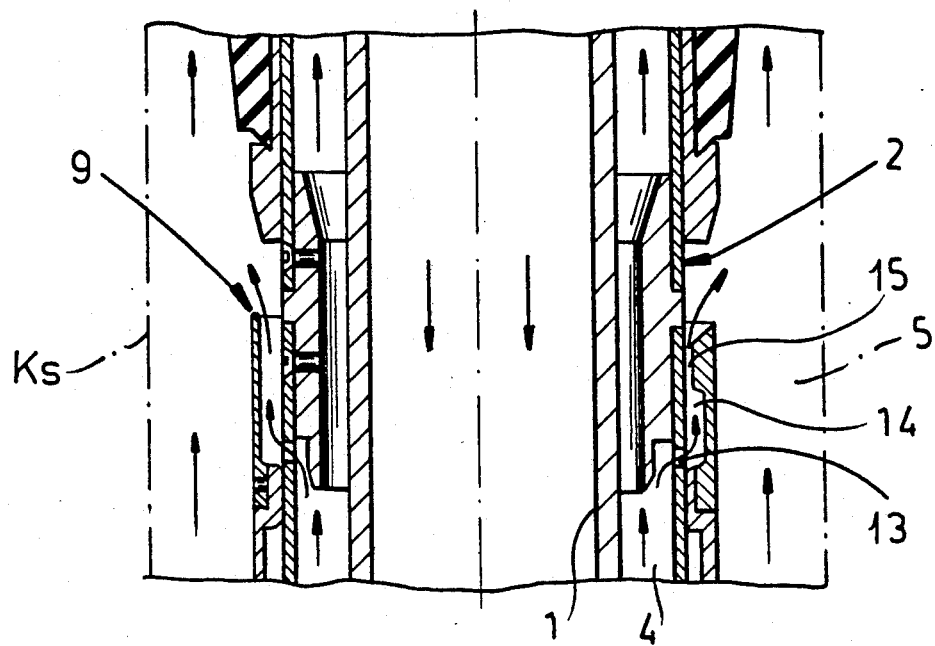
FIG. 4 is a detail of the region IV of FIG. 1.

The construction of the additional outlet 9 can be determined from FIG. 4. It is constituted by peripherally spaced bores 13 communicating with the gap 4 between the inner tube 1 and the outer jacket 2 and opening into an annular distributing chamber 14. The distributing chamber 14 has a continuous annular gap or slit opening into the flow passage 5.

The means for controlling the flow cross section through the intake 8 and the additional outlet 9 has not been illustrated, but can be used in conjunction with the dimensioning and the control of the blowers 40 and 41 to match the flow cross sections through the intake and the additional outlet 9. As a result of the intake and additional outlet, a stabilizing flow in the reverse direction as represented by the arrows F in FIG. 1 can be provided.

The length of the device shown in FIG. 1 can be varied by making the tubes 1 and 2 telescoping, or the device can be fabricated at any desired length for corresponding lengths of the tube Ks and the neck configuration at 17 of the foil bubble Fb.

As can be seen from FIG. 1 at the right-hand part of this Figure, at the head of the device, a conical sleeve 16 can be provided which, together with the flow from the outlet 7 defines a constriction at the neck of the foil bubble Fb as represented by the arrow 17. The cone angle can amount to about 1°. If the gap is held small, the reverse flow previously described will be relatively substantial.

We claim:

1. A device provided with means for affixing said device to a blowing head of a film-blowing machine for feeding film-blowing air into a tube of a thermoplastic synthetic resin emerging from said head for blowing said tube to a tubular film, said device comprising:

an inner tube;

an outer tubular jacket spacedly surrounding said inner tube and defining an axially extending annular gap therewith supplied with the film-blowing air;

means at a foot of said device for connecting said device to said blowing head whereby a tube of a thermoplastic synthetic resin emerging from said head extends along said device and defines a clearance with said outer tubular jacket between said blowing head and a head of said device, said tube of thermoplastic synthetic resin expanding at said head of said device to form a balloon of blown film;

annular outlet openings formed in said outer tubular jacket proximal to said foot and to said head of said device for feeding said film-blowing air into said clearance;

at least one film-blowing air intake communicating with said inner tube and spaced from the annular outlet opening proximal to said foot for enabling film-blowing air to be sucked from said clearance into said inner tube;

at least one further air outlet opening spaced between said air intake and said annular outlet opening proximal to said head for introducing film-blowing air from said gap into said clearance; and means for matching the air drawn into said at least one intake with the air fed from said at least one further air outlet opening to stabilize at least .one of said tube and said balloon.

2. The device defined in claim 1 wherein said at least one intake is formed by a plurality of angularly equispaced tubular fittings extending through said inner tube and said jacket, and at least one turbulence screen disposed ahead of said tubular fittings along said jacket.

3. The device defined in claim 2 wherein said tubular fittings are mounted in respective streamline-shaped holders in said gap.

4. The device defined in claim 1 wherein said at least one further outlet opening comprises a plurality of bores formed circumferentially around said jacket and communicating with said gap between said inner tube and said Jacket, said bores opening into an annular distribution space around said jacket, said distribution space communicating with said clearance through a circumferentially extending annular outlet slot.

5. The device defined in claim 1 wherein at least one of said inlet and said further outlet opening is provided with means for controlling a flow cross section thereof.

6. The device defined in claim 1 wherein said jacket is formed with a conical sleeve tapered in a flow direction through said clearance, axially shiftable on said jacket, opening at said outlet opening at said head of the device and controlling constriction of a neck of said balloon.

7. The device defined in claim 6 wherein said at least one intake is formed by a plurality of angularly equispaced tubular fittings extending through said inner tube and said jacket, and at least one turbulence sieve disposed ahead of said tubular fittings along said jacket.

8. The device defined in claim 7 wherein said tubular fittings are mounted in respective streamline-shaped holders in said gap.

9. The device defined in claim 8 wherein said at least one further outlet opening comprises a plurality of bores formed circumferentially around said jacket and communicating with said gap between said inner tube and said jacket, said bores opening into an annular distribution space around said jacket, said distribution space communicating with said clearance through a circumferentially extending annular outlet slot.

10. The device defined in claim 9 wherein at least one of said inlet and said further outlet opening is provided with means for controlling a flow cross section thereof.

* * * * *